Patented Mar. 30, 1926.

1,579,093

UNITED STATES PATENT OFFICE.

FRANZIE ANTOINETTE DE SILVA, OF NEW YORK, N. Y.

CAST OR MOLDED ARTICLES.

No Drawing. Application filed April 9, 1925. Serial No. 21,984.

*To all whom it may concern:*

Be it known that I, FRANZIE ANTOINETTE DE SILVA, a citizen of the United States of America, of 25 Beaver Street, New York city, State of New York, United States of America, at present residing at 183 Westminster Bridge Road, Lambeth, in the county of London, England, have invented certain new and useful Improvements in or Relating to Cast or Molded Articles, of which the following is a specification.

This invention relates to the manufacture of cast or molded articles.

As is well understood, intense heat is required for the manufacture of iron or steel from titaniferous iron ores or for the reduction of titaniferous ores or iron sands, as the metal fuses at about 1850° centigrade.

The older processes for the reduction of iron sands or titaniferous ores were usually carried on in two stages, and in such manner that pig iron, or impure iron containing a large percentage of carbon, together with a pasty slag were first produced, the impure iron being subsequently reduced by a second operation to obtain a higher grade metal with a lower carbon content (titanium steel).

Recently, however (see The World Steel Company's Belgian Patent No. 315,740), it has been proposed to effect the complete reduction of iron sands or titaniferous ores in a single operation in an electric furnace so as to obtain a high grade metal with a low carbon content (titanium steel) directly from the iron sands or ores.

A suitable process for the direct production of titanium steel or a high grade metal with a low carbon content from titaniferous iron ores or iron sands consists inter alia, in spreading upon the surface of the material undergoing treatment a layer of conducting and reducing material, such as carbon, charcoal or graphite, together with a carbide, and in passing an electric current through the mixture so as to produce upon the surface of the material a radiant and intensely hot mantle composed of multiple arcs. Alternately, the carbon, etc. may be disposed around the walls of the furnaces in the form of plugs, or a plurality of electrodes may be employed with or without additional electric resistance heating, the arcs formed by the electrodes being allowed to play upon the reducing material on the surface of the bath. A further suitable process for the direct production of high grade titanium steel consists in subjecting the titaniferous iron sand or ores to a separation process (carried on magnetically or otherwise) and in first fusing or melting the concentrate in an electric arc furnace, and thereafter adding the reducing agents (carbon, charcoal or graphite, together with calcium carbide) whereupon the slagging of the impurities and the separation of the metal is rapidly effected.

I have discovered that the slag which is produced by the direct production in electric furnaces of titanium steel or a high grade metal with a low carbon content from iron sands or titaniferous ores, not only flows readily, but, on account of the intense heat generated in the electric furnace and the nature of the slag itself, which consists principally of titanic acid and other refractory materials such as titanium carbide, it forms when cold an intensely hard material which it is difficult or practically impossible to re-melt.

According to the present invention use is made of this discovery, and the slag, while still molten, and with or without previous concentration, is run, poured or cast into molds of suitable shape or configuration and allowed to cool or anneal, the cast or molded product being employed for any industrial purpose where a heat resisting, dense or extremely hard article is required, for example, as a lining material for stoves, furnaces, converters, boilers, or crucibles, or for the manufacture of bricks, blocks, tiles, slabs, trays, sheets, panels, linings, partitions, paving stones, cornices, or for materials for building or constructional work generally.

To this end the slag, preferably after being concentrated in the molten state by any suitable or known method, for example by rotation, is drawn off from the electric furnace, and, while still molten, is cast or poured into molds preferably after being subjected to heavy pressure either before it is cast into the molds or in the molds themselves so as to extrude all air bubbles or spongy substances therefrom. A dense and extremely hard substance is thereby produced corresponding in configuration to the shape of the mold employed. The higher the temperature of the slag during the molten state, and the higher the pressure applied during molding, the greater the density of the cast articles will be. The articles produced are also unbreakable, indestructible, and as aforesaid are capable of resisting very high temperatures as the material composing them is practically unmeltable.

According to another mode of procedure a layer or layers of powdered or sheet asbestos, convas, cloth or the like is or are placed in the molds and the molten mass is poured or allowed to flow therein so that, in the case of a single sheet or layer, the material covers both sides thereof, or in the case of double sheets or layers is located between the same. Hydraulic or other pressure may thereafter be applied so that sheets of any required size are produced which can be employed as fire-resisting or unbreakable materials for roofing purposes, walls, partitions, tiles, linings or other construction work.

The material while in a molten state and before being cast into the molds may be mixed with any plastic substance or compound adapted to impart any desired qualities thereto, and a coloring medium or mediums may be added. The material can also be crushed and used as an ingredient in paints.

What I claim and desire to secure by Letters Patent of the United States is:—

1. A dense, extremely hard and practically unmeltable shaped article composed principally of titanic acid and other refractory materials such as titanium carbide.

2. A dense, extremely hard and practically unmelatable article which has been cast from the slag produced in the operation of reducing iron sands and which is composed principally of titanic acid and other refractory materials.

3. An article of manufacture comprising layers of material and alternate layers of a dense, extremely hard and practically unmeltable substance composed principally of titanic acid and other refractory materials such as titanium carbide.

4. An article of manufacture comprising layers of fire resisting material and alternate layers of a dense, extremely hard, and practically unmeltable substance composed principally of titanic acid and other refractory materials such as titanium carbide.

FRANZIE ANTOINETTE DE SILVA.